United States Patent [19]

Perdue

[11] Patent Number: 4,600,467
[45] Date of Patent: Jul. 15, 1986

[54] APPARATUS AND METHOD FOR TIRE RECAPPING

[75] Inventor: Thad A. Perdue, Muscle Shoals, Ala.

[73] Assignee: Robbins Tire and Rubber Company, Inc., Tuscumbia, Ala.

[21] Appl. No.: 650,340

[22] Filed: Sep. 13, 1984

[51] Int. Cl.$^4$ .......................................... B29H 30/54
[52] U.S. Cl. ................................. 156/394.1; 156/96; 156/909; 425/14; 425/17; 425/36; 425/58; 264/36
[58] Field of Search .................................. 156/95–97, 156/110.1, 128.1, 128.6, 129, 130, 130.3, 130.5, 130.7, 909, 394.1; 425/14–17, 21–22, 36, 58; 264/36; 157/13

[56] References Cited

U.S. PATENT DOCUMENTS

| | | | |
|---|---|---|---|
| 1,707,014 | 3/1929 | Hopkinson | 156/96 |
| 3,207,647 | 9/1965 | Schelkmann | 156/909 |
| 3,236,709 | 2/1966 | Carver | 156/96 |
| 3,752,726 | 8/1973 | Barefoot | 156/96 |
| 4,153,497 | 5/1979 | Budrioli | 156/96 |
| 4,274,897 | 6/1981 | Barefoot | 156/96 |

FOREIGN PATENT DOCUMENTS 555727 9/1943 United Kingdom ................. 156/96

Primary Examiner—Lois E. Boland
Attorney, Agent, or Firm—Kuhn Muller and Bazerman

[57] ABSTRACT

In combination with a tire casing, including a preformed, pre-cured, or uncured tread disposed about its periphery, and a curing envelope covering said tread and at least the outwardly facing side walls and bead portion of the tire casing, means are disclosed for effecting a tight and uniform seal between the said curing envelope and tire casing. These comprise a pair of annular sealing members, each having a central hub and a peripheral circumferential surface adapted to engage with the bead portion of the tire casing; a pair of unitary backing members, each having a central hub and portions at equal radial distances from the said hub which are engageable with the inwardly facing peripheral edge of said tire casing; and threaded fastener means extending between each said annular member and said backing member to enable the annular and backing members to be drawn toward one another to effect a clamping action between the members and intervening envelope and tire bead as the members are drawn together.

5 Claims, 8 Drawing Figures

FIG. 1
FIG. 2
FIG. 3
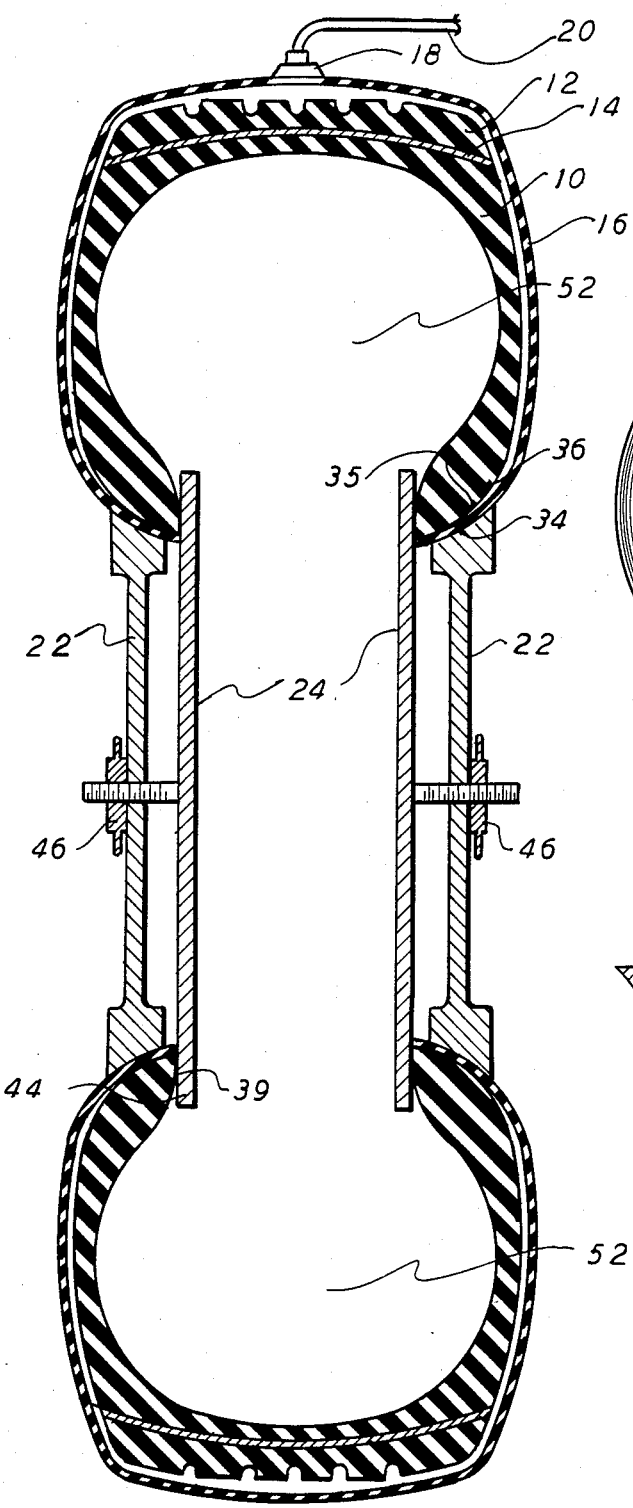
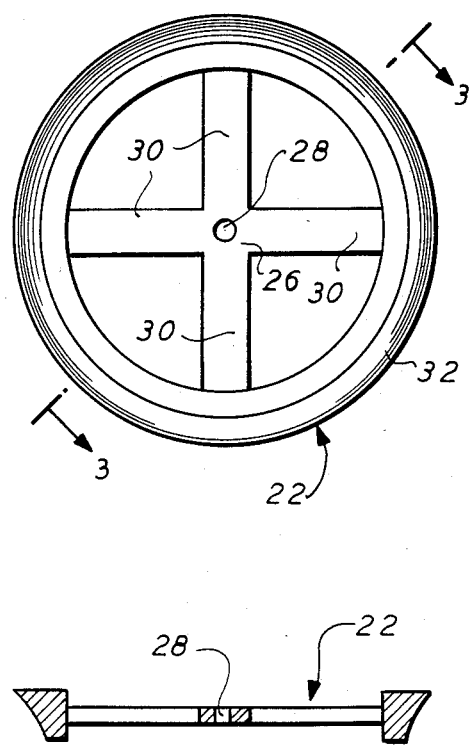
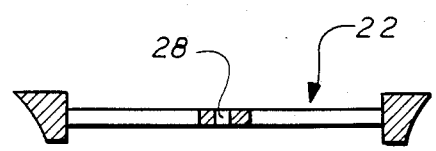

APPARATUS AND METHOD FOR TIRE RECAPPING

BACKGROUND OF INVENTION

This invention relates generally to apparatus and methods for use in the retreading or recapping of tires, and more specifically relates to apparatus and methods for effecting a high quality uniform seal between the tire casing and a curing envelope which covers the tire and retread strip to exclude undesired gases and steam during the heat and pressure cure stage of the recapping process.

In recent years, a method of retreading tires, sometimes referred to as moldless retreading, has gained increasing acceptance in the recapping industry. According to this method, a strip of pre-cured and pre-molded or an uncured tread is applied to a worn tire casing or carcass which has been previously prepared, as by buffing. A layer of suitable binding material is provided between the tread strip and the surface of the tire, commonly an uncured cushion gum. A thin layer or layers of cement may be used to help secure the tire casing, cushion gum and tread strip to one another to provide a temporary assembly for subsequent heat curing.

The aforementioned assembly of casing, tire tread and rubber or rubber-like cushion gum, prior to curing, is enclosed at least partially in a so-called curing envelope, which comprises a relatively strong flexible and resilient material such as a rubber, or plastic. The assembly is then placed in a heating oven or autoclave, and subjected to suitable temperatures and pressures for a period adequate to effect a full cure at the cushion gum bonding zone, i.e. a cure between the tread and the tire casing as will assure a fully satisfactory bond. During the heat cure step the protective envelope, the space within which is connected to a pressure source lower than that in the oven (which can be a vent to atmosphere), serves to keep gases and steam away from the materials being cured, as such gases or steam can interfere with formation of a fully cured and effective bond.

In certain portions of the prior art, including in Carver, U.S. Pat. No. 3,236,709, an operation of the aforementioned nature is carried out with the tire casing mounted on a suitable rim with or without removable flanges, and with an internal air tube or other arrangement enabling pressurization of the interior of the tire carcass—this in order to maintain a firm contact between the curing envelope and the external wall of the tire casing and the rim flanges or other flanges. This has as its objective to assure a relatively good seal between the curing envelope and the casing, since in the absence of such seal, leakage of hot gases, including steam, into the curing space can markedly affect the quality of the bond between the tread and the tire carcass. Such an arrangement, however, has the detrimental effect of preventing or at least limiting heat from reaching the interior space of the tire carcass, which slows the cure rate and can also retard uniformity in heating at the cure zone.

In U.S. Pat. No. 4,274,897 to Barefoot, these shortcomings are recognized, and a construction is set forth which in certain embodiments of the invention endeavors to provide an external curing envelope about the outer surfaces of the tire carcass, which envelope is sealed to the tire by means cooperating with the outer tire side wall, so that it is not necessary to use an inner inflatable tube or rim, thereby permitting heat to reach the interior portion of the tire casing. In most of the embodiments of Barefoot, however, the seal between envelope and tire carcass is effected at the side wall portion of same, where experience has shown that a seal can only be maintained with great difficulty—in view of the irregularities of the said wall, resulting from not only wear, but from the embossments which usually appear on same. While in FIGS. 8 and 9 of Barefoot, a rim engages with a portion of the tire bead (which is superior to engagement at the side wall), the two sealing rims are biased by a plurality of springs drawing same toward each other, and in some instances against intermittent spacers. This tends to produce a distortion of the tire body; it cannot provide a positive controllable pressure at the sealing zone; and therefore can result in inferior sealing.

A somewhat similar arrangement is taught in Barefoot, U.S. Pat. No. 3,752,726.

In accordance with the foregoing, it may be regarded as an object of the present invention, to provide apparatus and method for use in sealing cure envelopes to tire casings undergoing retreading, which enable an exceedingly effective seal between the sealing envelope and the tire carcass, thereby assuring that a quality retread results during the subsequent heat cure of the assembly.

It is a further object of the present invention, to provide apparatus of the foregoing character, which may be simply and effectively employed by relatively unskilled personnel, and yet provide the fully effective seal aforementioned.

It is a still further object of the invention, to provide apparatus and method as aforementioned, which can be used to seal a pair of sealing envelopes to the tire casing, respectively to enable sealing covers for both the outer and inner surfaces of the tire casing.

It is a yet further object of the present invention, to provide apparatus and methodology as aforementioned, which, while providing a fully effective seal for the exterior facing portions of a tire carcass, and as optionally desired for the internally facing portions of the carcass, yet enable full access of heat to the interior annular reaches of the casing during the heat curing process.

SUMMARY OF INVENTION

Now in accordance with the present invention, the foregoing objects, and others as will become apparent in the course of the ensuing specification, are achieved in apparatus and method which are used in combination with a tire casing having a pre-formed, pre-cured or an uncured tire tread disposed about its periphery, and a curing envelope covering the tread and at least the outwardly facing side walls and bead portion of the tire casing.

The apparatus of the invention preferably comprises a pair of annular sealing members each having a central hub and a peripheral circumferential surface adapted to engage with the bead portion of the tire. A pair of unitary backing pieces are provided, each of provided which also has a central hub, and includes portions at equal radial distances from the hub which are engagable with the inwardly facing peripheral edge of the tire carcass. A threaded member extends between the respective hub portion of the annular sealing member and the backing member, so that a backing nut threaded upon the member and bearing against one of the hubs enables the annular and backing members to be drawn toward one another to effect a clamping action between the members and the intervening tire bead and sandwiched curing envelope.

The portion of the annular sealing member which contacts the tire bead may be formed inwardly as to have a reduced radius at the side thereof which faces the interior of the tire, to thereby define a cammed surface at the contact zone facing the tire bead. This arrangement assures that drawing of the annular and backing members toward each other effects a continuously tighter seal as the two members approach one another due to operator action.

The portions of the backing member contacting the tire casing can similarly be contoured to the rounded surfaces of the adjacent tire edge.

The backing member in an embodiment of the invention which is particularly applicable for use where a single curing envelope is applied at the outer portions of the tire, may constitute a simple hub from which cross-portions or arms extend, with the ends of the cross-portions or arms effecting the desired contact with the edge of the tire.

In a further embodiment of the invention, the backing member may constitute a central hub to which is affixed by spokes or cross-arms an entire circumferential wheel or rim, which engages the entire facing surface of the tire. This embodiment of the invention is particularly suitable where it is desired to employ a second curing envelope which envelops the inner surfaces of the tire. This type of arrangement is considered by many skilled in the art to be desirable as a further precaution to effect sealing about the tire being cured. This arrangement at the same time enables heat to fully reach the interior of the carcass, in accordance with a principal objective of the invention.

BRIEF DESCRIPTION OF DRAWINGS

The invention is diagramatically illustrated, by way of example, in the drawings appended hereto, in which:

FIG. 1 is a longitudinal cross-sectional view through a tire casing to which is affixed a tread and curing envelope, and with the envelope being sealed to the tire by means of a first embodiment of apparatus in accordance with the present invention;

FIG. 2 is a plan view of the annular sealing member used in accordance with the invention, taken from the side which faces the tire bead;

FIG. 3 is a cross-sectional view taken along the line 3—3, of the annular sealing member of FIG. 2;

DESCRIPTION OF PREFERRED EMBODIMENTS

Figure 6:
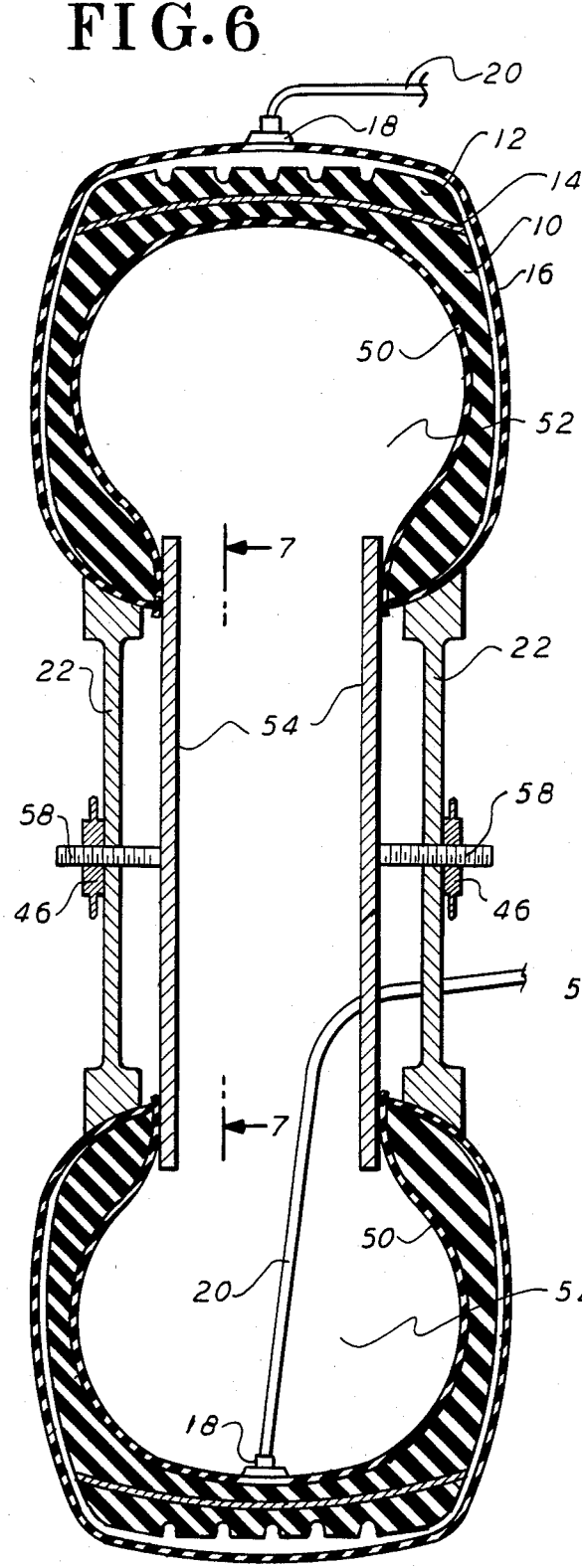
FIG. 6 is a longitudinal cross-sectional view of the type set forth in FIG. 1, but depicting use of a second embodiment of apparatus in accordance with the invention.

In FIG. 1 there is shown a tire carcass or casing 10 which has been associated with a length of retread 12 which is to be bonded to the said carcass 10. The carcass 10 in accordance with known practice in this art has previously been buffed at its surface where same abounds the retread 12, and an intervening layer 14 of an uncured rubber or rubber-like cushion gum material which is intended to provide the adhesion between the pieces to be joined, has previously been applied. A cement is also preferably applied to either the tread, or to the tire casing, or to both, so that a relatively stable temporary assembly is enabled for the subsequent heat cure.

Pursuant to the invention, a curing envelope 16, typically comprising rubber or other resilient elastomeric material, is shown applied about the exterior facing portions of the tire. A vent 18 is provided to the interior of the envelope, from which a tube 20 extends. Since in practice the entire assembly shown in FIG. 1 during the curing process is placed in an oven or autoclave and subjected to heat and pressure, a normally positive pressure (typically e.g. 50–100 p.s.i.) is present at the entire environment in which the assembly of FIG. 1 is present, whereby it is normally sufficient for tube 20 merely to provide a vent to atmosphere in order to assure that the interior of the envelope is effectively evacuated. Alternatively, however, it is possible to connect the tube 20 to a vacuum pump or the like, to effect a greater pressure differential tending to withdraw any air, steam or other gases from the envelope, to maintain the space within the envelope free from gases.

In accordance with the present invention, it is seen that in order to maintain a positive, uniform, and highly effective seal between envelope 16 and tire casing 10, annular sealing members 22 are provided, each of which coacts with a spaced backing member 24, as to clamp in highly effective and sandwiched fashion, the periphery of casing 10 and the adjacent portion of the curing envelope 16.

Sealing member 22 is also seen in FIGS. 2 and 3 to comprise a wheel-like member which includes a central hub 26 having an opening 28, and through which pass two cross-pieces defining arms or spokes 30 which extend to a circumference 32. Circumference 32, as best seen in FIG. 1, is formed with an outward face 34 which is curved so that when in use, as in FIG. 1, the radial distance of that face from the hub decreases in the direction of the tire interior, and it will therefore be evident that such face 34 in making contact with the tire bead 36 at the so-called "heel" portion 35 of same, provides a cam type of action as the member 22 is drawn inwardly toward backing member 24.

Figure 4:
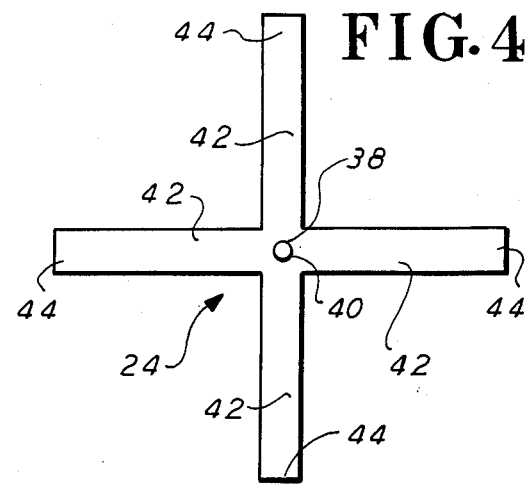
FIG. 4 is a plan view of the backing member utilized in the FIG. 1 apparatus.
Figure 5:
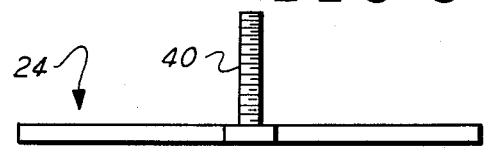
FIG. 5 is a side elevational view of the backing member of FIG. 4.

The backing member 24, as seen in FIGS. 4 and 5, may in the embodiment of FIG. 1 comprise a simple cross-piece, which includes a hub portion 38, from which may extend a threaded stud 40. The ends 44 of the arms 42 which extend from hub 38, may either have generally straight surfaces, as appear in FIG. 1, or may be curved as to define a contoured surface which can interfit in nested fashion with the facing portion 39 of the tire periphery.

In practice as shown in FIG. 1, after the curing envelope 16 is properly emplaced, the assembly consisting of the backing members 24 and the annular sealing members 22, is arranged as shown, with a threaded stud 40 passing through the opening 26 in each annular sealing member. A nut 46, which can be of the wing-nut variety to enable ready operator use, is placed over each stud 40, and the operator then proceeds to tighten those nuts, thereby drawing the pieces 22 and 24 directly toward each other in firm controlled fashion. As this is done the camming action of the face 34 on the annular sealing member, uniformly presses against and clamps the sealing envelope to the heel 35 of the tire bead, to effect a completely uniform, tight and effective seal between that envelope and the tire bead. Thereafter the tire is subjected to the heating and pressure process as aforementioned, to effect the desired cure.

Figure 7:
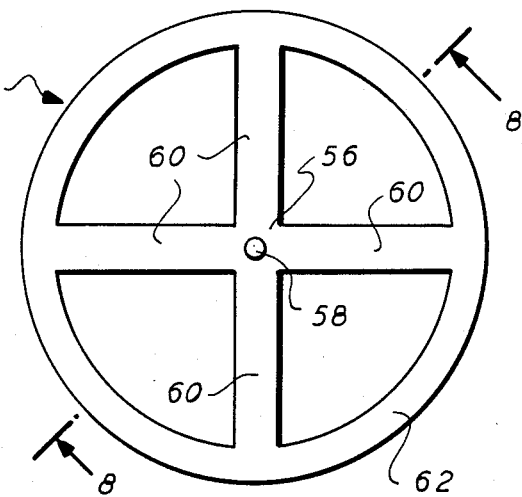
FIG. 7 is a top plan view of the backing member utilized in the apparatus shown in FIG. 6.
Figure 8:
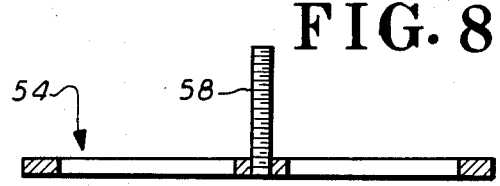
FIG. 8 is a side elevational view of the backing member of FIG. 7.

In FIGS. 6, 7 and 8, a further embodiment of the present invention is set forth. The embodiment shown is similar to that discussed in connection with FIGS. 1 through 5, including the same annular sealing member 22 as aforementioned, which effects the required seal between the envelope 16 and the bead of the tire carcass.

In the present instance, however, it is firstly assumed that a second sealing envelope 50 is provided, which is intended to cover the interior facing portions of the tire casing. It is to be noted at this point that again, as in the case of FIG. 1, heat will desirably be applied to all portions of the tire, and that it is desirable for same to reach the interior regions 52 of such tire. While some practioners in the present art take the position that it is not critically important to maintain a curing envelope about interior surfaces of the tire, others are of the firm opinion that this is a highly desirable feature as a further precaution against steam and undesired gases reaching anywhere in the vicinity of those portions of the tire which are being cured. Heretofore, however, it has not been possible to both seal the interior as provided in accordance with this embodiment of the invention, and also enable heat to effectively reach the volume 52.

In accordance however with the embodiment shown, the backing member now comprises a second annular member 54, which again includes a central hub 56 having a stud 58 extending from same. A series of arms 60 radiate from the hub extend to a circumference 62. The surface of that circumference which abounds the tire, may either be of essentially flat form as shown in FIG. 4, or as already mentioned, can be curved in the direction of the facing tire surface, so as to provide a contoured fit where the said rim engages and sandwiches the envelope 50.

Once again, the arrangement is such that the operator having assembled the arrangement of FIG. 6, need only emplace the nuts 46, which can be of the wing-nut variety, and then proceed to tighten same to thereby effect a highly effective and uniform seal, both with respect to the envelope 16 as aforementioned, as well as with respect to the second envelope 50.

It will be appreciated that the embodiment of FIGS. 6 through 8, can also be used with a single exterior envelope, as described for FIGS. 1-5.

It will again be evident that in the instances of all embodiments of the invention illustrated, the interior volume 52 of the tire is completely accessible to heat, thereby enabling the highly effective cure aforementioned, and greatly shortening the cure time.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. In combination with a tire casing, including a preformed, precured, or uncured tread disposed about its periphery, and a curing envelope covering said tread and at least the outwardly facing side walls and bead portion of the said tire casing; means for effecting a tight and uniform seal between the said curing envelope and tire casing, comprising:

a pair of annular sealing members, each having a central hub and a peripheral circumferential surface adapted to engage with the bead portion of said tire casing;

a pair of unitary backing members, each having a central hub and portions at equal radial distances from the said hub which are engagable with the inwardly facing peripheral edge of said tire casing; a pair of said annular and backing members being provided at each side of said tire; the said pairs being mechanically independent of each other;

threaded fastener means extending between the hubs of each said annular member and said paired backing member to enable said annular and backing members to be drawn toward one another to effect a clamping action between said members and the intervening envelope and tire bead as said members are drawn together; the portion of said annular member contacting said tire bead being formed as to be contoured smoothly inwardly to have a reduced radius at the side thereof facing the interior of the tire, as to define a cam surface facing the cooperating surface of said bead, whereby drawing the said members toward each other effects a continuously tighter seal as the two members approach one another; and both the sealing members and backing members having openings in their plane, and the space between said backing members being free of obstructions, to thereby allow heat and gas flow to the interior of said tire casing during curing.

2. A device in accordance with claim 1, wherein the portions of the backing member which contact said tire peripheral edge are contoured to the adjacent rounded surface of said tire edge.

3. A device in accordance with claim 1, wherein the backing member comprises a hub portion from which extend a plurality of arms, the ends of said arms contacting the said inner facing edge of said tire.

4. A device in accordance with claim 1, wherein said backing member comprises a hub portion and a circumferential portion connected by arms to said hub.

5. A device in accordance with claim 1, wherein said fastener means comprises a threaded member extending between the said hub portions of said annular and backing members, and means for threadingly engaging said threaded member while bearing against at least one of said annular and backing members to controllably draw said annular and backing members together.

* * * * *